United States Patent

[11] 3,583,713

| | | | |
|---|---|---|---|
| [72] | Inventor | Eisuke Sugahara |
| | | Tokyo, Japan |
| [21] | Appl. No. | 853,294 |
| [22] | Filed | Aug. 27, 1969 |
| [45] | Patented | June 8, 1971 |
| [73] | Assignee | Nippon Piston Ring Kabushiki Kaisha |
| | | Tokyo, Japan |
| [32] | Priority | Sept. 12, 1968 |
| [33] | | Japan |
| [31] | | 43/65209 |

[54] PISTON RING
4 Claims, 4 Drawing Figs.

[52] U.S. Cl. .................................................. 277/235A
[51] Int. Cl. ................................................... F16j 15/32
[50] Field of Search ........................................... 277/235, 235 A

[56] References Cited
UNITED STATES PATENTS

| | | | |
|---|---|---|---|
| 2,313,395 | 3/1943 | Phillips ......................... | 277/235A |
| 2,905,512 | 9/1959 | Anderson ....................... | 277/235A |
| 3,095,204 | 6/1963 | Nelly ............................. | 277/235A |

Primary Examiner—Robert L. Smith
Attorney—Kelman and Berman

ABSTRACT: The piston rings of an internal combustion engine are made of an aluminum alloy of high heat conductivity and plated with hard chromium on all external radial and axial surfaces.

PATENTED JUN 8 1971 3,583,713

INVENTOR
Eisuke Sugahara
BY: Kelman and Berman
AGENTS

PISTON RING

BACKGROUND OF THE INVENTION

This invention relates to reciprocating internal combustion engines, and particularly to piston rings.

The requirements to be met by good piston rings, both compression and oil rings, are mainly three:
1. long useful life without axial flutter;
2. long useful life without excessive blowby;
3. rapid heat transfer between the piston and the cylinder wall.

Ring flutter has been a serious problem in engines in which the linear piston velocity is high. The initially minimal tolerance between the radial walls of the ring groove and of the piston ring is increased by impact of the ring under inertial forces when the direction of piston movement is reversed, and results in deformation of the ring. Excessive flutter leads to rapid wear of the axial ring surfaces, and to excessive blowby with corresponding reduction in engine power output.

It has been attempted to reduce the effects of inertial impact on the radial surfaces of the rings and of the ring grooves in the piston by reducing the axial width of the usual gapped cast iron rings, but the resulting decrease in buckling resistance and subsequent accelerated wear of the piston rings have been found to make this approach to the known problem impractical, even when the rings are chromium plated for reducing friction.

SUMMARY OF THE INVENTION

It has now been found that piston rings superior to the usual cast iron rings can be made from light metals, that is, metals having a specific gravity not substantially higher than 2.7, and more specifically, aluminum and magnesium alloys of adequate mechanical strength, if their outer radial and axial surfaces are coated with hard chromium.

DESCRIPTION OF THE PREFERRED EMBODIMENT

Figure 1:
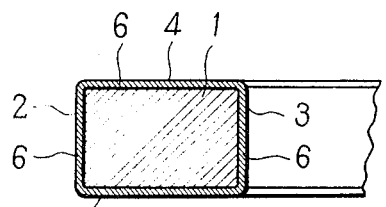
FIG. 1 shows a compression ring of the invention in fragmentary axial section.

FIG. 1 shows a compression ring of the invention whose core 1 is an aluminum alloy bar of rectangular cross section bent into the conventional open ring shape. Respective portions of a continuous, heavy chromium coating 6 constitute the two arcuate axial faces 2,3 and the two flat radial faces 4,5 of the ring.

Figure 2:
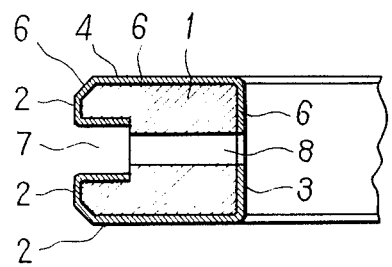
FIG. 2 shows an oil ring in a view corresponding to that of FIG. 1.

FIG. 2 illustrates a ventilated oil ring essentially consisting of an aluminum alloy core 1 and a hard chromium coating 6 which forms axial facings 2,3 and radial facings 4,5 on the outer ring surfaces. Because of the limited throwing power of chromium plating solutions, the chromium coating also covers the radial walls of a circumferential groove 7 in the ring, but does not or not significantly extend into the slots 8 which connect the groove 7 with orifices in the inner axial ring wall in a manner conventional in itself.

Figure 3:
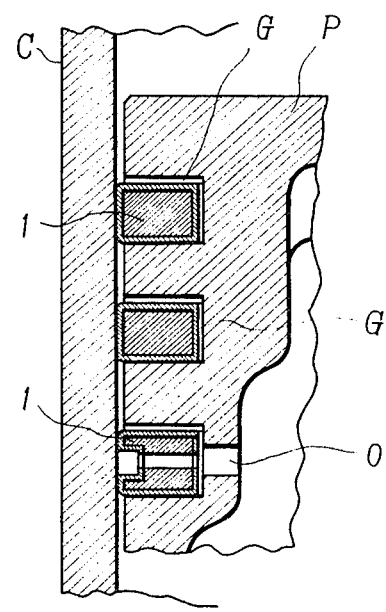
FIG. 3 illustrates a reciprocating internal combustion engine equipped with the piston rings of FIGS. 1 and 2 in fragmentary elevation section on the axis of one cylinder.

The cylinder C and piston P of an engine equipped with two compression rings of the type shown in FIG. 1 and one oil ring of the type described with reference to FIG. 2 are illustrated in FIG. 3 whose showing is limited to the ring belt of the piston and the axially corresponding cylinder portion. The slots in the oil ring communicate with oil ducts O in the piston P.

Figure 4:
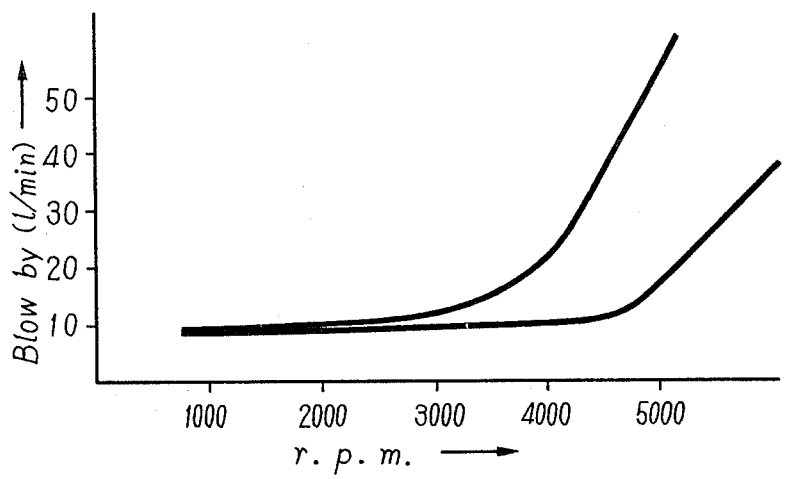
FIG. 4 is a diagram showing blowby in a test engine as a function of engine speed when the engine is equipped with conventional cast iron rings only and with one piston ring of the invention.

FIG. 4 shows the results of comparison rungs of the same test engine when equipped with three chromium plated cast iron rings on each piston (upper curve) and when equipped with one chromium plated aluminum alloy ring of the invention, and two chromium plated cast iron rings below the aluminum alloy ring. The engine had six cylinders of 75 mm. bore and 85 mm. stroke and a total swept volume of 2,253 ml. Its maximum output was 115 HP at 5200 r.p.m., its maximum torque 17 kgm. at 3600 r.p.m. All piston rings employed had an axial width of 2 mm. and a radial thickness of 3.6 mm. No expander was used. As is evident from FIG. 4 which shows blowby in liters per minute as a function of rotary speed in r.p.m., blowby reaches significant values with a set of cast-iron rings at lower speeds and is much more severe at high rotary speeds than with otherwise identical or comparable sets of rings which include only one ring of the invention on each piston.

Analogous advantages are achieved by the use of the oil rings of the invention, and by the use of light metal alloy rings to the exclusion of cast iron rings.

Because of the low weight of the piston rings of the invention, ring flutter does not present a significant problem. Wear on the radial surfaces of the rings and of the associated grooves is extremely slow. The outer hard metal facing of the rings prevents ring wear, but also reduces wear of the ring grooves because of the low coefficient of friction between the facing and the piston material. The thermal conductivity of the rings of the invention is far superior to that of cast iron rings.

It has also been found that piston ring tension can be controlled more precisely and reproducibly by means of expanders with the rings of the invention than with the cast iron rings whose modulus of elasticity is very much higher.

Aluminum alloys which have been found useful for making the piston rings of the invention include the types listed by their chemical composition limits in Tables I and II:

TABLE I

|    | Alloy A | Alloy B | Alloy C |
|----|---------|---------|---------|
| Cu | 3.9–5.0 | 3.5–4.5 | 1.5–2.5. |
| Si | 0.5–1.2 | 0.9 max | 0.5–1.3. |
| Fe | 1.0 max | 1.0 max | 0.6–1.5. |
| Mn | 0.4–1.2 | 0.2 max | 0.2 max. |
| Mg | 0.05 max | 0.45–0.9 | 1.2–1.8. |
| Zn | 0.25 max | 0.25 max | 0.20 max. |
| Cr | 0.10 max | 0.10 max |  |
| Ti | 0.15 max | 0.05 max | 0.20 max. |
| Ni |  | 1.7–2.3 | 0.6–1.4. |
| Al | (¹) | (¹) | (¹). |

¹ Balance.

TABLE II

|    | Alloy D | Alloy E | Alloy F |
|----|---------|---------|---------|
| Cu | 3.5–4.5 | 0.8–1.3 | 0.1 max. |
| Si | 0.6 max | 11.0–13.0 | 0.53 max. |
| Mg | 1.2–1.8 | 0.7–1.3 | 9.5–11.0. |
| Zn | 0.1 max | 0.1 max | 0.1 max. |
| Fe | 0.8 max | 0.8 max | 0.35 max. |
| Mn | 0.1 max | 0.1 max | 0.1 max. |
| Ni | 1.7–2.3 | 1.0–2.5 |  |
| Ti | 0.2 max | 0.2 max | 0.2 max. |
| Al | (¹) | (¹) | (¹). |

¹ Balance.

Alloys A—C are used for wrought or forged rings of the invention and should have a minimum tensile strength of 38 kg./mm.². Alloys E—G are used for cast rings of the invention and should have minimum tensile strengths of 30 kg./mm.², a minimum of 28 kg./mm.² being acceptable in Alloy E.

The illustrated piston rings were chromium plated in a conventional manner. After solvent degreasing, alkaline etching and acid pickling, they were immersed in a zincate solution. The zinc coating formed thereby was removed by acid pickling, and another zinc coating was prepared by a second tip in zincate solution. The coated piston rings were then chromium plated to a thickness of 0.05 millimeters on the axial outer surfaces, The coatings simultaneously formed on the radial surfaces and on the axial inner surface had a thickness of 0.007 mm. It is generally preferred to make the chromium coating on the outer axial surface 0.03 to 0.3 mm. thick, with a coating thickness of 0.003—0.02 mm. on all other surfaces.

Good results have also been obtained with aluminum alloy piston rings which were given a hard oxide coating by anodizing. Similarly chromium plated magnesium alloy rings were prepared from the alloys whose compositions are listed in Table III.

TABLE III

|     | Alloy G | Alloy H | Alloy I |
| --- | --- | --- | --- |
| Al  | 8.3-9.7 | 5.3-6.7 | 5.8-7.2 |
| Zn  | 1.6-2.4 | 2.5-3.5 | 0.4-1.5 |
| Mn  | 0.10-0.50 | 0.15-0.60 | 0.15 max. |
| Fe  |  |  | 0.01 max. |
| Cu  | 0.25 max. | 0.25 max. | 0.10 max. |
| Ni  | 0.01 max. | 0.01 max. |  |
| Mg  | (1) | (1) | (1). |

1. Balance.

Alloys G and H were used for cast rings and alloy I for forged or wrought rings of the invention. The tensile strengths of the cast alloys was at least 24 kg./mm.$^2$, that of the wrought alloy 25 kg./mm.$^2$.

The aluminum and magnesium alloys listed above are staple articles of commerce, and it will be understood that they are listed merely by way of example, and that the invention is not limited to the specific alloys enumerated.

What I claim is:

1. In a gapped piston ring having an axis, two axially offset outer radial faces, and two radially offset outer and inner axial faces, the improvement which comprises: a. a core of a metal having a specific gravity not substantially greater than 2.7; and b. a facing defining said outer faces and consisting of hard chromium electroplate.

2. In a piston ring as set forth in claim 1, said core consisting of an aluminum alloy.

3. In a piston ring as set forth in claim 2, said chromium facing having a thickness of 0.03 to 0.3 millimeters on said outer axial face.

4. In a piston ring as set forth in claim 3, said chromium facing having a thickness of 0.003 to 0.02 millimeters on said radial faces, and said inner axial face carrying a chromium electroplate 0.003 to 0.02 millimeters thick.